(12) United States Patent
Cheng et al.

(10) Patent No.: US 9,067,323 B2
(45) Date of Patent: Jun. 30, 2015

(54) DEVICE USED FOR CAPTURING MICRO-PARTICLES AND A MICRO-PARTICLES TRANSPORTING EQUIPMENT PROVIDED WITH THE DEVICE THEREOF

(75) Inventors: Xiaomin Cheng, Ningbo (CN); Lin Zhou, Ningbo (CN); Hongchao Fan, Ningbo (CN)

(73) Assignee: Ningbo University of Technology, Ningbo (CN)

( * ) Notice: Subject to any disclaimer, the term of this patent is extended or adjusted under 35 U.S.C. 154(b) by 252 days.

(21) Appl. No.: 13/807,490

(22) PCT Filed: Mar. 18, 2011

(86) PCT No.: PCT/CN2011/000439
§ 371 (c)(1),
(2), (4) Date: Dec. 28, 2012

(87) PCT Pub. No.: WO2012/006861
PCT Pub. Date: Jan. 19, 2012

(65) Prior Publication Data
US 2013/0101378 A1    Apr. 25, 2013

(30) Foreign Application Priority Data

Jul. 12, 2010  (CN) .......................... 2010 1 0228289

(51) Int. Cl.
*B25J 11/00*        (2006.01)
*B25J 15/00*        (2006.01)
*B25J 9/10*         (2006.01)

(52) U.S. Cl.
CPC *B25J 15/00* (2013.01); *B25J 11/00* (2013.01); *B25J 9/104* (2013.01)

(58) Field of Classification Search
CPC .......... B25J 7/00; B25J 11/00; B25J 15/0616; B25J 15/0683; B25J 9/104; B25J 15/00; B65G 49/045; B65G 49/061; H01L 21/6838; H05K 13/0408
USPC .................................. 294/183, 64.3; 73/866.5
See application file for complete search history.

(56) References Cited

U.S. PATENT DOCUMENTS 3,466,079 A * 9/1969 Mammel ...................... 294/64.3
3,835,338 A * 9/1974 Martin .......................... 310/331
(Continued)

OTHER PUBLICATIONS

Definition of "supercharger" downloaded from Encyclopedia Britannica Oct. 24, 2014.*

*Primary Examiner* — Peter Macchiarolo
*Assistant Examiner* — Natalie Huls
(74) *Attorney, Agent, or Firm* — Wang Law Firm, Inc.; Li K. Wang; Stephen Hsu (57) ABSTRACT

A device used for capturing micro-particles, which comprises a pressure regulator, a micro-jet nozzle, and a hydraulic device for providing injection liquid for the micro-jet nozzle; wherein the micro-jet nozzle is provided with an annular jet hole, the annular jet hole having a bottom end, a top end, an inner diameter, an entrance port located at the top end, and an injection port located at the bottom end, the output of the pressure regulator is connected to the entrance port of the micro-jet nozzle. Compared with the prior art, in the present invention, the liquid is taken as the medium, a kind of upward support on the micro-particles and a flow-around lift force perpendicular to the jet direction are generated by the micro-jet nozzle with the annular jet hole, which jointly act on the micro-particles, so as to achieve the micro-particle capture.

9 Claims, 10 Drawing Sheets

(56) References Cited

U.S. PATENT DOCUMENTS

| | | | |
|---|---|---|---|
| 4,257,637 A * | 3/1981 | Hassan et al. | 294/64.3 |
| 4,566,726 A * | 1/1986 | Correnti et al. | 294/64.3 |
| 6,030,013 A * | 2/2000 | Fruhling et al. | 294/64.3 |
| 6,048,011 A * | 4/2000 | Fruhling et al. | 294/64.3 |
| 7,360,322 B2 * | 4/2008 | Iwasaka et al. | 34/576 |
| 7,390,041 B2 * | 6/2008 | Horie et al. | 294/86.4 |
| 7,510,226 B2 * | 3/2009 | Akiyama | 294/64.3 |
| 8,419,094 B2 * | 4/2013 | Omiya et al. | 294/64.3 |
| 2001/0002380 A1 * | 5/2001 | Tominaga et al. | 483/55 |
| 2001/0011828 A1 * | 8/2001 | Ujita et al. | 294/64.1 |
| 2010/0166573 A1 * | 7/2010 | Magami et al. | 417/267 |
| 2014/0263578 A1 * | 9/2014 | Youngquist | 228/103 |

* cited by examiner

DEVICE USED FOR CAPTURING MICRO-PARTICLES AND A MICRO-PARTICLES TRANSPORTING EQUIPMENT PROVIDED WITH THE DEVICE THEREOF

CROSS REFERENCE TO RELATED PATENT APPLICATION

The present application is a PCT application No. PCT/CN2011/000439 entering the U.S.A. national stage and claiming the priority of the Chinese patent application No. 201010228289.4 filed on Jul. 12, 2010.

FIELD OF THE INVENTION

The present invention relates to a device used for capturing micro-particles and a micro-particles transporting equipment provided with the device thereof.

BACKGROUND

With the continuous extension of the scientific research toward the micro field, the technology and products of the micro-manufacturing have developed rapidly in the last decade. The United States, Japan, Germany and other countries have placed micro-manufacturing in a very high position and taken it as one of the mainstream of manufacturing science. Moreover, the development of micro-manufacturing technology and industrial is another area for China to leap toward high technology.

"Deposition Formation" is an important concept in the micro-manufacturing field. The deposition formation can superimpose and accumulate or assemble two-dimensional or three-dimensional micro-structure and component needed "from bottom to top" through the manipulation of micro-particles. The smooth capture, directed transport and precise positioning of the micro-particles are the key technologies and one of the important foundations of "Deposition Formation". Therefore, how to realize the capture and manipulation of the micro-particles is a research topic hot and difficult in the current field of micro-manufacturing.

According to literature, the capture and manipulation of micro-particles is mainly achieved by means of the laser, the RF pressure and plasma etc until the present time. Optical Tweezers (OT) are the most representative method to achieve the capture and manipulation of the micro-particles. The so-called "Optical Tweezers" is a three-dimensional gradient optical potential wells formed with the use of the mechanical effect of the momentum transfer between light and matter, which is a tool to conduct the non-injury and non-contact manipulation on the micro objects. As early as in 1986, Ashkin of the Bell Labs introduced a single beam laser into a high numerical aperture lens to form a three-dimensional optical potential wells, proving that it could conduct the sub-contact and non-destructive living operations on the catch without affecting the surrounding environment basically and was vividly called "Optical Tweezers". Since the advent of the "Optical Tweezers", the research on the "Optical Tweezers" caused by different types of laser beams is more and more comprehensive, and its application is also more and more wide. Until now, from the original single-beam gradient force optical potential well, the "Optical Tweezers" have gradually evolved into the double Optical Tweezers, three Optical Tweezers, four Optical Tweezers, array Optical Tweezers, beam workstation, holographic Optical Tweezers and other different types of optical potential wells, which have provided skillful and effective tools for the research on the micro-manufacturing based on the capture and manipulation of micro-particles.

Secondly, the "Dielectrophoresis" is another way to realize the capture and manipulation of micro-particles. Brown et. al. of the Harvard University used the triaxial atomic force microscope contact-free tweezer (TACT) and the dielectrophoresis to achieve the manipulation of the nano-substances in the aqueous medium. They apply the RF pressure to the needle tip and the inner shell of the TACT and cause the outer shell connected to the ground. The needle tip is designed with opening to let the electric field escape and produce a zero electric field outside the surface. Since the dielectric constant of water is greater than most of the substances, the water will push the nano-particles toward the position of the minimum value of the electric field. As the periphery of the tip belongs to a repulsive force region, it can be ensured that only a particle is captured for one time. This method can be used to capture a single semiconductor quantum, carbon nanotube, semiconductor nanowires, biological particles (e.g. virus) and other micro-particles with the diameter as small as 4 nm, so as to perform the assembly and manipulation of the micro-structure.

In addition, Huang et. al. of the Swiss Federal Institute of Technology, relying on the near-field effect of the plasma, coordinate with the micro-fluidics and the control layer to achieve the capture and manipulation of the micro-particles. They have developed an optofluidic device composed by the plasma optical trap and the micro-fluidics, which can manipulate cells or micro-particles without the complex optical architecture of the traditional "Optical Tweezers".

The above stated "Optical Tweezers", "Dielectrophoresis" and "Electromagnetic Field" are three internationally representative ways to achieve the capture and manipulation of the micro-particles at present. However, the realization of the three ways requires the specific hardware equipment; the costs for the construction and using of the whole system are high; moreover, it also has higher requirements on the application environment and is mainly oriented to the research institutes and the personnel researching the theoretical basis in the university and cannot be applied in the industrial practice and conducted the commercialization promotion.

SUMMARY OF THE INVENTION

It is the first object of the present invention to provide a device used for capturing micro-particles easily to be achieved with a simple structure and low manufacturing cost.

It is the second object of the present invention to provide micro-particles transport equipment using the above device easily to be achieved with a simple overall structure and low manufacturing cost.

For achieving the first object, the device used for capturing micro-particles, each micro-particle having a diameter, comprises:

a pressure regulator having an input and an output;

a micro-jet nozzle coupled to the pressure regulator, the micro-jet nozzle having a length and an axis; and a hydraulic device for providing injection liquid for the micro-jet nozzle, the hydraulic device having an outlet pipe connected to the input of the pressure regulator, wherein the micro-jet nozzle is provided with an annular jet hole disposed along the axis of the micro-jet nozzle and extends through the length of the micro jet nozzle, the annular jet hole having a bottom end, a top end, an inner diameter, an entrance port located at the top end, and an injection port located at the bottom end, the inner diameter matches the diameter of the micro-particles to be captured, the output of the pressure regulator is connected to the entrance port of the micro-jet nozzle.

In order to obtain a better effect of the micro-particle capture and improve the reliability and success rate of the micro-particle capture, as a preference, the inner diameter $\psi_{pi}$ of the annular jet hole and the diameter $\Phi_w$ of the micro-particles meet the following condition: $\Phi_2 - 10\ \mu m \le \psi_{pi} \le \Phi_w$, the units of $\psi_{pi}$ and $\Phi_w$ are μm.

In order to facilitate the processing and replacement, as a preference, the micro-jet nozzle further comprises a nozzle housing and a nozzle core, the nozzle housing being provided with a through hole with an inner wall extending along the axis of the micro jet nozzle;

wherein the nozzle core comprises a core head and a core body, the core head sitting on the top of the nozzle housing and attached to the nozzle housing, the core body being inserted in the through hole, and the annular jet hole being formed between the inner wall of the through hole of the nozzle housing and the core body, and a plurality of inlet holes are formed on the core head.

As a preference, the nozzle core has a T-shaped cross section and extends along the central axis of the nozzle core, and the plurality of inlet holes comprise multiple holes distributed circumferentially on the core head of the nozzle core. The T-shaped nozzle core enables the nozzle core to be easily mated to different nozzle housings. The T-shaped top also facilitates achieving a well connection with the core body. Multiple inlet holes circumferentially formed on the nozzle core can improve the quantity and the speed of flow entering into inlet.

In order to produce the injection liquid of the pressure needed for the micro-particle capture on the micro jet nozzle, the hydraulic device can adopt all sorts of hydraulic systems in the prior art. Preferably, he hydraulic device comprises: a plunger pump; a motor connected to the plunger pump; and a supercharger connected to the directional valve through a hydraulic oil passage, which is provided with a directional control valve, the supercharger being activated by the plunger pump through the hydraulic oil passage, the supercharger making the injection liquid be absorbed and be discharged.

For achieving the automatic control, as a preference, the directional control valve is connected with the PLC electrical control system.

For achieving the second above stated object, a micro-particles transporting equipment comprises:

a base having a length and a width;

a workbench, disposed on top of the base and able to move along the length and along the width the base;

a container containing the micro-particles, which is fixed on the workbench and below the micro-jet nozzle;

a supporting seat, movably disposed perpendicularly on the base, and provided with a bracket extending outwardly from and perpendicularly to the supporting seat which can move vertically and, the end of the bracket is attached to the pressure regulator.

In order to enable the workbench to realize the shifting on the base respectively along the X-axis and Y-axis directions, as a preference, the workbench includes a first base placed on top of the base, a second base placed on top of the first base, a first motor for moving the first base, and a second motor for moving the second base;

the base is provided with a first guiding rail arranged along the length of the base, the first base can move along the first guiding rail driven by the first motor;

the first base is provided with a second guiding rail arranged along the width of the base, the second base can move along the second guiding rail driven by the second motor.

In order to facilitate the stroke control and the convenient detection of the moving positions of the first and second bases at any time, preferably, the first guiding rail has a first grating ruler for tracking and back feeding the first base, and the second guiding rail has a second grating ruler for tracking and back feeding the second base.

In order to limit the moving distances of the first and second bases and prevent the first and second bases slipping from the guide rails, preferably, the base further comprises a first anti-collision device for limiting movement of the first base, while the first base further comprises a second anti-collision device for limiting movement of the second base.

In order to guarantee that the first and second bases have very low thrust ripple with the low or high speeds, to ensure the uniform velocity of the moving and the positioning precision of the workbench, preferably, the first and second motors are linear motors.

Compared with the prior art, in the present invention, the liquid is taken as the medium, a kind of upward support on the micro-particles and a flow-around lift force perpendicular to the jet direction is generated by the micro-jet nozzle with the annular jet hole, which jointly act on the micro-particles and have a "clamping" effect on the micro-particles, "clamping" the micro-particle under the micro-jet nozzle firmly like tweezers, so as to achieve the micro-particle capture, which is a new means and method to capture micro-particles. In addition, compared with the traditional devices that use the laser, the RF pressure and the plasma to capture the micro-particles, this kind of device used for capturing micro-particles of the present invention, is easier to be realized and manufactured. Moreover, the apparatus of the Present invention can be set up and operated in the ordinary daily life environment, not requiring a specific application environment, which greatly reduces the implementation costs of the capture device and is conducive to the promotion and use of the capture device, expanding the applications and fields.

DETAILED DESCRIPTION OF THE PREFERRED EMBODIMENT

To enable a further understanding of the innovative and technological content of the invention herein, refer to the detailed description of the invention and the accompanying drawings below:

FIGS. 1-6 show the perspective views and fundamental diagram of the device used for capturing micro-particles of the embodiment. The device used for capturing micro-particles comprises a micro-jet nozzle 1 and a hydraulic device 3 which can provide injection liquid for the micro jet nozzle 1, wherein, the injection liquid can be water and also can be other fluids that facilitate the micro-particles to float on the liquid surface. The pure water free of impurities is as the injection liquid in the embodiment.

Figure 4:
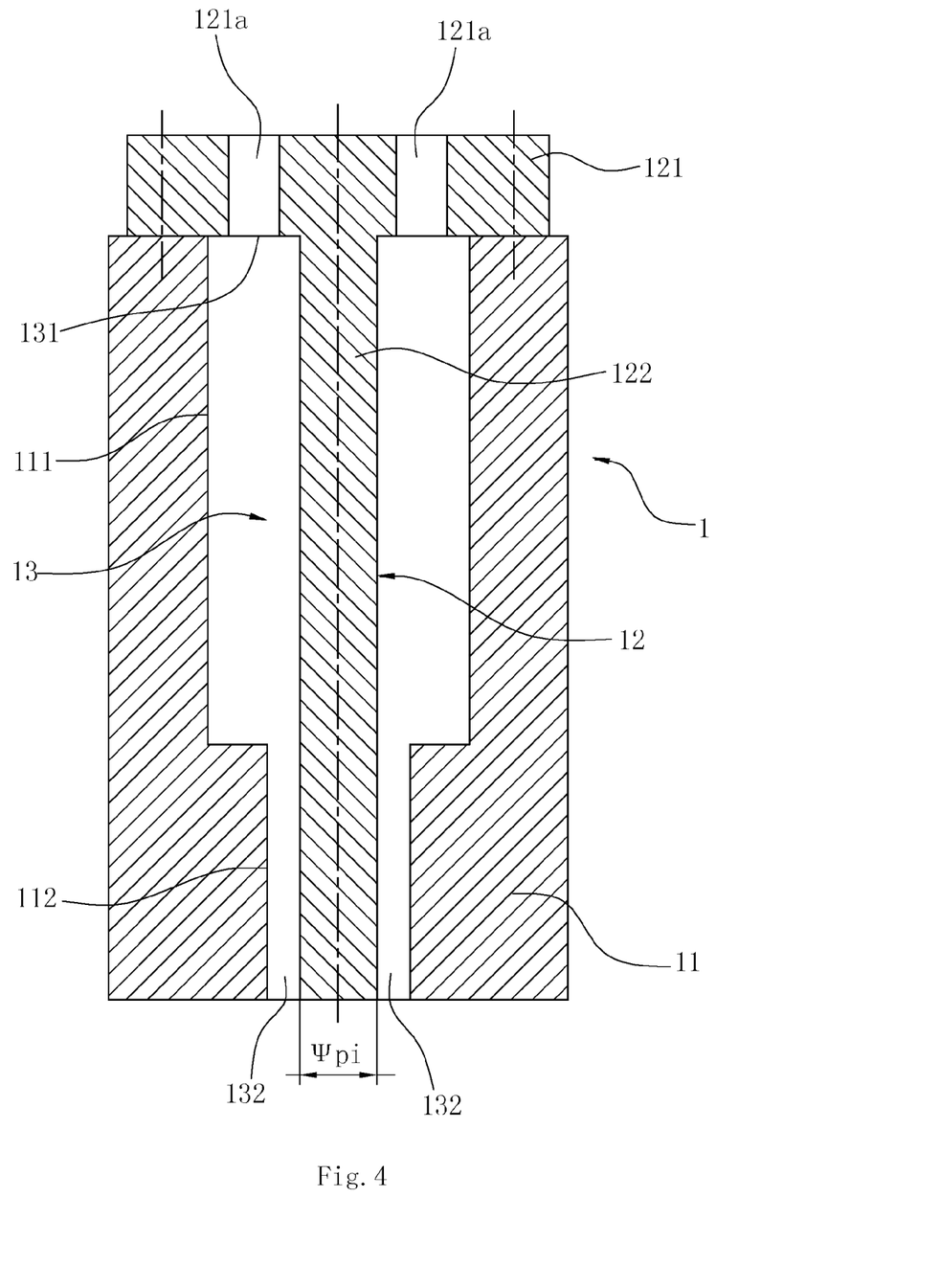
FIG. 4 is a sectional view of the micro-jet nozzle of the device in accordance with the embodiment of the present invention.

The micro jet nozzle 1 comprises a nozzle housing 11 and a nozzle core 12. Inside of the nozzle housing 11 is equipped with a through hole that extends along the axial direction. The nozzle core 12 has a T-shaped cross section along the central axis of the nozzle core 12. The nozzle core 12 comprises a core head 121 and a core body 122, the core head 121 is connected to the top of the nozzle housing 11 through bolts, the core body 122 is inserted in the through hole, and an annular jet hole 13 disposed along the axis of the micro-jet nozzle 1 is formed between the inner wall of the through hole of the nozzle housing 11 and the core body 122. Moreover, multiple inlet holes 121a are formed on and distributed along the circumference of the core head 121. The inlet holes 121a can communicate with the entrance port 131 of the annular jet hole 13 and act as a liquid inlet of the whole micro jet nozzle 1. In order to make manufacturing easier, the hole of the nozzle housing 11 can be formed preferably with a step-shape, the large diameter portion 111 of which faces the entrance port 131 of the core head, while the small diameter portion 112 of which faces the micro-particle 9 as an injection port 132.

Figure 1:
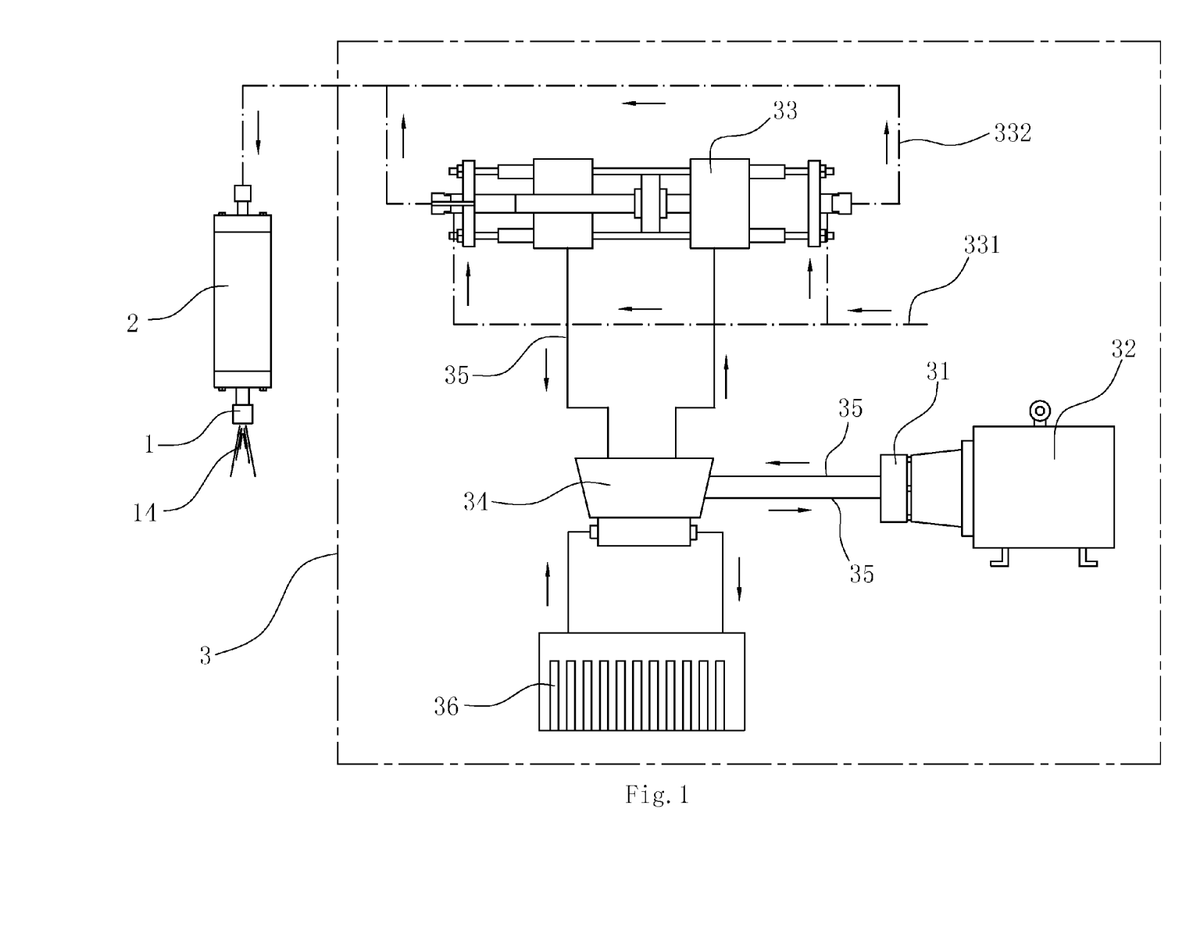
FIG. 1 is a view of a device used for capturing micro-particles in accordance with an embodiment of the present invention.
Figure 2:
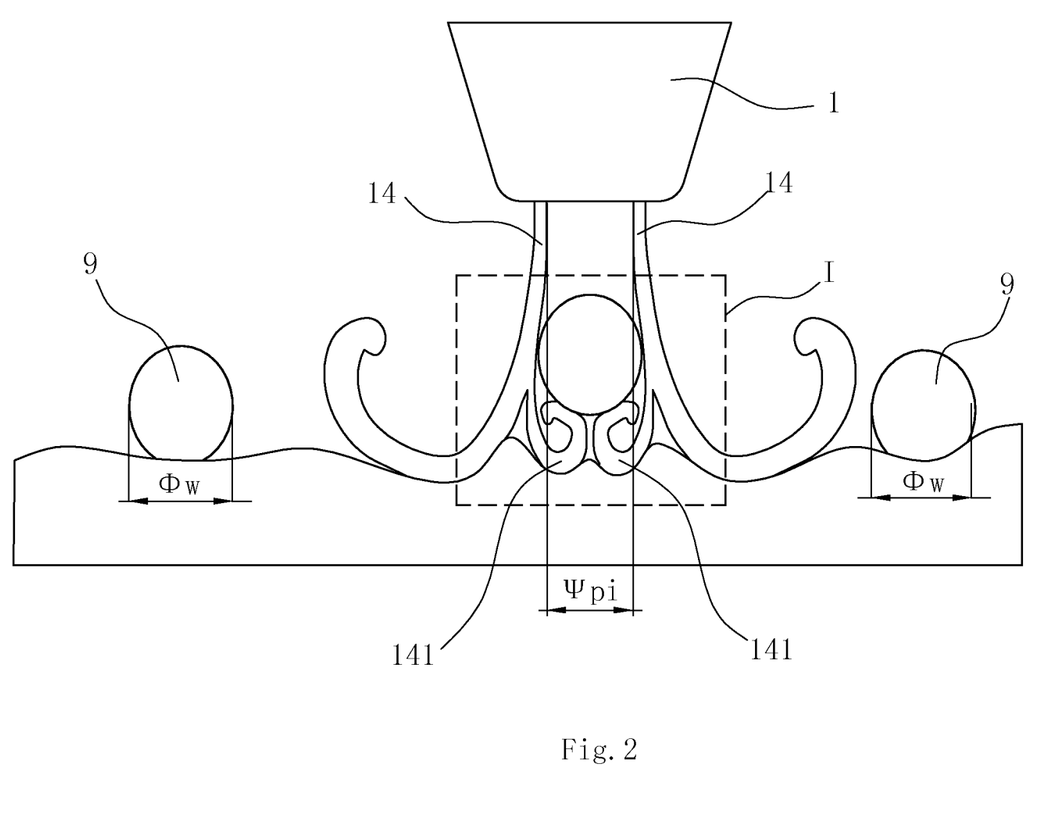
FIG. 2 is a view of the micro-jet nozzle of the device when capturing a micro-particle in accordance with the embodiment of the present invention.

Since the port size of the micro-jet nozzle 1 is smaller and the fluid pressure from the micro-jet nozzle 1 is greater, in order to stabilize the pressure of the jet liquid and ensure the fluid from the micro-jet nozzle 1 can effectively clamp the micro-particle 9, a pressure regulator 2 also must be provided between the micro-jet nozzle 1 and the hydraulic device 3. The input of the pressure regulator 2 is connected with the outlet pipe of the hydraulic device 3, while the output of the regulator 2 is connected with the entrance port 131 of the annular jet hole 13 through the inlet hole 121a of the core head 121.

The hydraulic device 3 used in the embodiment can be any kind of hydraulic systems in the prior arts. Preferably, the hydraulic device 3 can be following structure: the hydraulic device 3 comprises a plunger pump 31, a motor 32 which drives the plunger pump 31 to operate and a supercharger 33 which can make the injection liquid be absorbed and be discharged, Wherein the supercharger 33 connects with an input passage 331 and an output passage 332, the supercharger 33 communicates with the plunger pump 31 through a hydraulic oil passage 35 which is provided with a directional control valve 34. The hydraulic oil alternately enters both sides of the piston of the supercharger 33 through the directional control valve 34. The directional control valve 34 is controlled by the PLC electrical control system 36 through the control circuit, achieving the adjustment within the supercharging range to control the shape of the output micro-jet 14.

The PLC electrical control system can use prior art and here will not be repeated in the embodiment. When the hydraulic device 3 works, the motor 32 drives the plunger pump 31 to output the hydraulic oil to alternately enter the both sides of the piston in the supercharger 33 along the hydraulic oil passage 35, thereby the piston is driven to repeat to move back and forth, so as to make the water flow alternately be absorbed and discharged at both sides of the supercharger 33. After the output water flow is stabilized with pressure by the pressure regulator 2, the liquid water enters into the annular jet hole 13 through the inlet hole 121a on the core head 121 and jets from the injection port 132, and finally forms the micro jet 14.

The following elaborates the production conditions and the operating principle of the device used for capturing micro-particles of the present embodiment.

When the micro-jet 14 shots out from the micro jet nozzle 1 flows through the surface of the micro-particles 9, as the liquid-solid interface effect will form a boundary layer on the micro-particle surface 93, the fluid micelle in the boundary micelle is blocked by the viscous force, the kinetic energy is consumed and the flow rate is reduced. Therefore, the nearer the fluid micelle to the micro-particle surface 93, the greater the viscous force suffered, and the faster the flow rate decreases.

In the embodiment, a spherical coordinate system is used for the analysis of the liquid-solid boundary layer jets distribution and the pressure variation. A vertical plane is taken to be orthogonal to the micro-particle in the maximum cross section of the micro-particle, resulting in a circular cross-sectional plane. The first point of intersection A between the micro-jet 14 and the micro-particle surface 93 is taken as the origin of coordinates. The intersection line along the micro-particle surface 93 is selected as the X axis with the direction downward, while the Y axis is perpendicular to the micro-particle surface 93.

Figure 5:
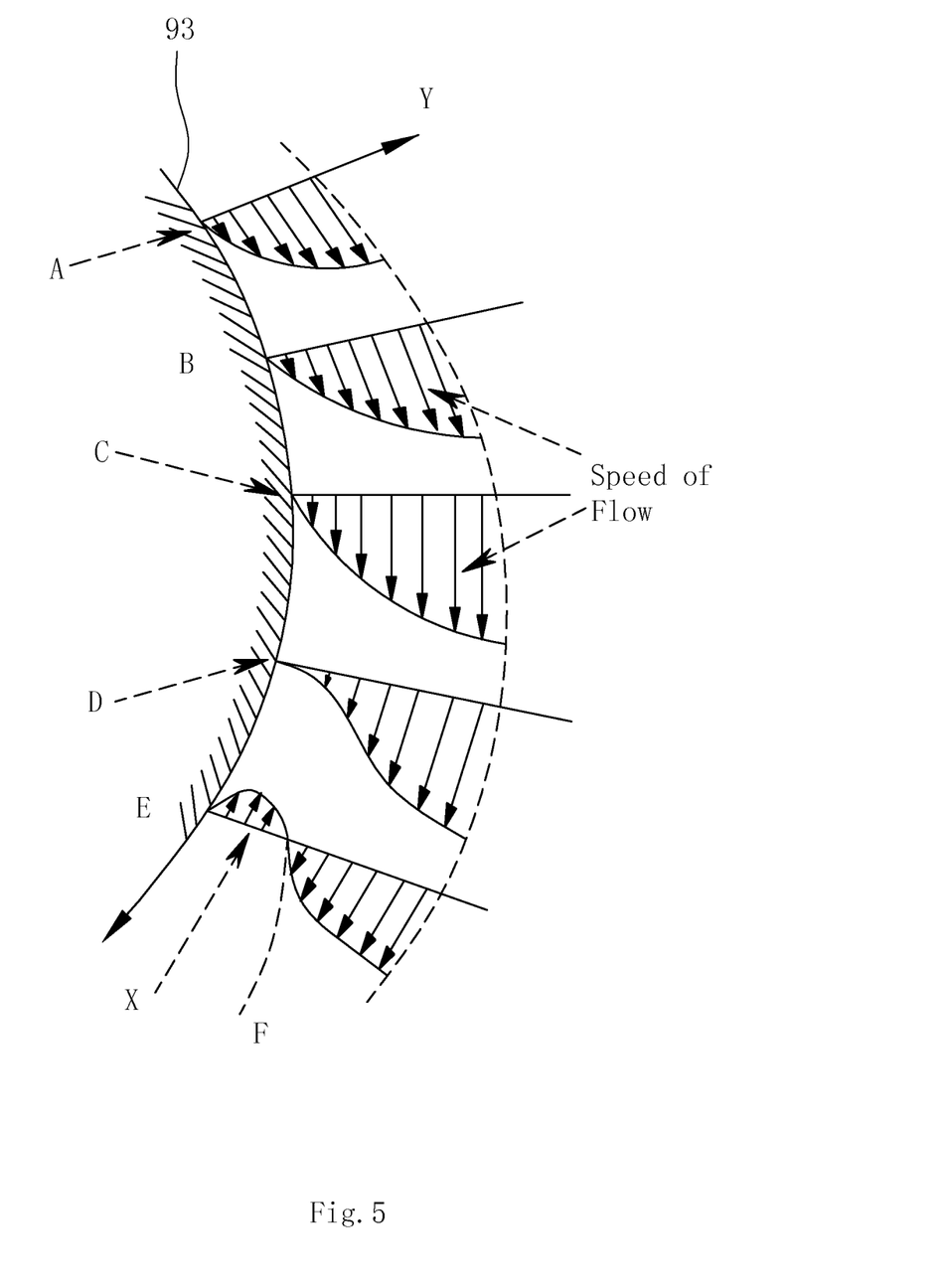
FIG. 5 is a flow velocity variety and characteristic diagram of a micro jet boundary layer in accordance with the embodiment of the present invention.

The five points, A, B, C, D and E, are selected on the micro-particle surface 93, see FIG. 5. Wherein, the decompression acceleration section (i.e.

$$\left(\text{i.e. } \frac{\partial p}{\partial x} < 0\right)$$

is from Point A to Point C. In this section, although the viscous force causes the consumption of the kinetic energy of the fluid micelle, since part of the pressure energy of the fluid is converted into the kinetic energy, such consumption can be made up, so that the fluid still has enough kinetic energy to continue to move on. Point C whose pressure gradient is zero (i.e.

$$\left(\text{i.e. } \frac{\partial p}{\partial x} = 0\right)$$

is a turning point, and the flow rate at Point C is the biggest. After Point C, it is a supercharging deceleration section (i.e.

$$\left(\text{i.e. } \frac{\partial p}{\partial x} > 0\right)$$

where not only part of the kinetic energy of the fluid will be converted into the pressure energy, but also the retardation of the viscous force will continue to consume the kinetic energy.

Therefore, the reducing process of the flow rate is speeded up, and the boundary layer of the flow rate is continuously thickening. When the fluid flows to Point D on the micro-particle surface 93, the kinetic energy of the fluid micelle near the surface has been exhausted, where the fluid micelle will be standstill. At this time, the Point D will be called as the breakaway point. The fluid characteristics of the boundary layer of the micro-particle surface 93 are shown in Table 1.

TABLE 1

Fluid Characteristics of the Boundary Layer of Micro-particle Surface

| Micro-particle Surface Position | A-C | C (Turning point) | C-D | D (Breakaway point) | D-E |
|---|---|---|---|---|---|
| Fluid Characteristics | Decompression acceleration section | Biggest flow rate The pressure gradient is zero | Supercharging deceleration section | The flow rate is zero | Forming a swirling flow |
| Pressure Gradient | $\frac{\partial p}{\partial x} < 0$ | $\frac{\partial p}{\partial x} = 0$ | | $\frac{\partial p}{\partial x} > 0$ | |
| Speed Gradient | | $\frac{\partial u}{\partial y} > 0$ | | $\frac{\partial u}{\partial y} = 0$ | $\frac{\partial u}{\partial y} < 0$ |

Table 1 is specified as follows: The boundary layer of the micro-particle surface 93 is a layer of viscous flowing thin area appearing on the solid surface in the liquid-solid contact. When the micro-jet 14 contacts with the micro-particle surface 93, the fluid micelle in the boundary layer is blocked by the viscous force and the kinetic energy is consumed. The nearer the fluid micelle to the micro-particle surface 93, the greater the viscous force suffered, and the faster the flow rate decreases.

Seen from Table 1, the boundary corresponding to the section from Point A to Point C on the micro-particle surface 93 is in a positive pressure gradient state, therefore, the force along the boundary layer flowing direction helps to overcome the shear stress of the micro-particle surface 93 and has a speed-up effect on the flow of the fluid in the boundary layer, resulting in the weakening of the growth rate of the thickness of the boundary layer. So the thickness of the boundary layer does not increase greatly, and this section is the decompression acceleration section of the fluid. When it is to the turning point C, the flow rate increases to the maximum and the pressure gradient reduced to zero. The section after Point C is in a negative pressure gradient state, where the force along the opposite direction of the flow has a deceleration effect on the flow of the boundary layer, thereby increasing the growth rate of the thickness of the boundary layer, and resulting in the gradual thickening of the boundary layer. If the negative pressure gradient is large enough, the fluid may have the change of the flowing direction on the micro-particle surface 93. As shown in Point D in FIG. 5 (the breakaway point, the front and rear fluid states are respectively $$\frac{\partial u}{\partial y} > 0 \text{ and } \frac{\partial u}{\partial y} < 0),$$

therefore, Starting from Point D, the boundary layer will be departing from the micro-particle surface 93, resulting the separation of the boundary layer.

Figure 3:
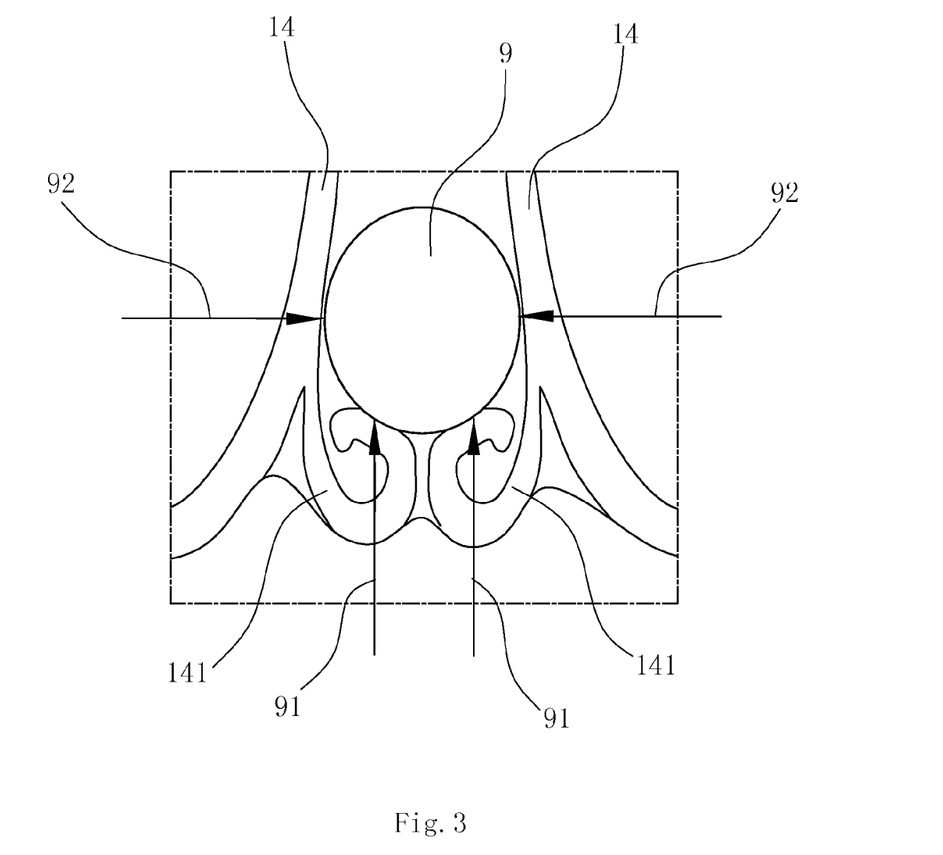
FIG. 3 is an enlarged drawing of Part I shown in FIG. 2 (showing working condition of the micro-particle and the micro jet nozzle).

After Point D, the fluid micelle in the second half of the boundary layer of the micro-particle will suffer a greater blockade, resulting in part of the fluid micelle forced to flow reversely and forcing the boundary layer to continue to depart from the micro-particle surface 93. Due to the emergence of the backflow, the micro jet 14 forms a symmetric vortex 141 (also known as the swirling flow) in the lower part of the micro-particle to support the micro-particle, see FIG. 2. Meanwhile, the micro jet 14 also has the flow-around lift 92 force perpendicular to the jet direction on the micro-particle. The forces on the micro-particle are shown at FIG. 3. The tension of the liquid surface, the supporting force 91 of the symmetric vortex 141 and the flow-around lift 92 jointly act on the micro-particle and have a clamp effect on the micro-particle, eventually coming into being a kind of "tweezers" which is formed by the liquid and able to grip micro-objects, a tool similar to the "optical tweezers" that can achieve the micro-particle capture. Since in the embodiment the water is used as the injection liquid of the micro-jet 14, we call it the "Water Tweezers".

In short, due to the characteristics of the micro-particle and the fluid boundary layer, the boundary layer is generated from the front edge of the micro-particle and developed afterward along the micro-particle surface 93. In the negative pressure area with the increase of the pressure of the micro-particle surface 93, the boundary layer will depart from the micro-particle surface 93, forcing the fluid to reversely flow back between the micro-particle surface 93 and the boundary layer and inducing a symmetric vortex 141 (a swirling flow) to appear in the lower portion of the micro-particle, thereby forming the upward supporting force 91 on the micro-particle. Meanwhile, due to the blockade of the micro-particle, the micro-jet 14 will form the flow-around lift 92 perpendiculars to the jet direction on the micro-particle. Thus, the supporting force 91 of the symmetric vortex 141 and the flow-around lift 92 jointly act on the micro-particle and have a clamp effect on the micro-particle, eventually forming the "Water Tweezers".

Ultimately, the singular point method is adopted to calculate and illustrate the conditions for the formation of the "Water Tweezers" by the micro jet 14. Put a dipole with the strength as M in the origin of coordinates and superimpose it with the jet, the flow function of the combined flow field ψ shall be the sum of the flow function of the jet $\psi_j$ and that of the dipole $\psi_d$, that is:

$$\Psi = \Psi_j + \Psi_d = \frac{1}{2}vR^2\sin^2\theta - \frac{M}{4\pi R}\sin^2\theta = \left(\frac{1}{2}vR^2 - \frac{M}{4\pi R}\right)\sin^2\theta \quad (1)$$

When ψ=0, the flow line (surface) is a zero flow line (surface) and Formula (1) becomes:

$$\left(\frac{1}{2}vR^2 - \frac{M}{4\pi R}\right)\sin^2\theta = 0 \quad (2)$$

The result is:

$$\left.\begin{array}{l}\frac{1}{2}vR^2 - \frac{M}{4\pi R} = 0\\ \theta = 0, \pi\end{array}\right\} \quad (3)$$

In Formula (3), the first equation is a spherical equation, written in a standard form as:

$$R^3 - \frac{M}{2\pi v} = 0 \quad (4)$$

Formula (4) refers that the zero flow line (surface) is the micro-particle (ball) with the radius of $a=\sqrt[3]{M/2\pi v}$. The second equation in Formula (3) indicates that the z axis is a zero flow line (surface).

Therefore, if you want to get the flow field of the micro-particle with the jet around a radius of a, the strength of the dipole must be:

$$M = 2\pi a^3 v \quad (5)$$

Substitute Formula (5) into Formula (1), then the flow function of the flow of the micro-particle with the jet around a radius of a is:

$$\psi = \frac{1}{2}vR^2\left[1 - \left(\frac{a}{R}\right)^3\right]\sin^2\theta \quad (6)$$

The velocity potential function $\Phi$ of the flow of the micro-particle with the jet around a radius of a shall be the sum of the jet potential function and the velocity potential function of the dipole with the strength of $M=2\pi a^3 v$, that is:

$$\Phi = vR\cos\theta + \frac{M}{4\pi R^2}\cos\theta = \quad (7)$$
$$vR\cos\theta + \frac{2\pi a^3 v}{4\pi R^2}\cos\theta = vR\left[1 + \frac{1}{2}\left(\frac{a}{R}\right)^3\right]\cos\theta$$

In the above Formula (1) to (7), $\psi$ refers to the flow function; $\Phi$ refers to the velocity potential function; v refers to the jet velocity; a refers to the radius of a micro-particle; M refers to the strength of the space dipole; $\theta$ refers to the included angle between the ligature which connects a certain point in the flow field to the dipole and the positive direction of Z axis; R refers to the distance between a certain point in the flow field and the dipole.

The position of the breakaway point D may also be obtained by calculation. Including, the velocity of any point in the flow field:

$$\left.\begin{array}{l}v_R = \frac{\partial \Phi}{\partial R} = v\left[1 - \left(\frac{a}{R}\right)^3\right]\cos\theta\\ v_\theta = \frac{1}{R}\frac{\partial \Phi}{\partial \theta} = -v\left[1 + \frac{1}{2}\left(\frac{a}{R}\right)^3\right]\sin\theta\end{array}\right\} \quad (8)$$

There is R=a on the micro-particle surface 93, substitute R=a in the above formula, then the velocity of the jet on the micro-particle surface 93:

$$\left.\begin{array}{l}v_R = 0\\ v_\theta = -\frac{3}{2}v\sin\theta\end{array}\right\} \quad (9)$$

When $\theta$ is equal to 0 and $\pi$, $v_\theta=0$, the velocity of the jet is zero when the jet contacts with the micro-particle or the lower quartile point at the instant. This also explains why the vortex generates.

Thus, the breakaway point D happens at the place where the maximum velocity is $$\theta = \pm\frac{\pi}{2}.$$

The velocity is:

$$|v_\theta|_{max} = \frac{3}{2}v \quad (10)$$

Therefore, according to the precepts of the flow function and the velocity potential function, it is possible to control the flow rate and pressure of the micro jet 14 on the micro-particle surface 93, thus controlling the position of the breakaway point D, enabling the micro-jet 14 to form a symmetric vortex 141 (swirling flow) in the lower portion of the micro-particle, so as to achieve the support and clamp on the micro-particle 9.

In conclusion, to form the best "Water Tweezers", the parameters, such as the jet velocity, the radius of the micro-particle and the inner diameter of the micro-jet nozzle 1, must be reasonably matched. However, in order to reliably achieve the clamp effect of the "Water Tweezers" and improve the success rate of the capture, the inner diameter of the annular jet hole 13 in the micro jet nozzle 1 and the diameter of the micro-particles 9 shall meet the following relation: $\Phi_w-10$ $\mu m \leq \psi_{pi} \leq \Phi_w$, wherein, $\psi_{pi}$ refers to the inner diameter of the annular jet hole 13 and $\Phi_w$ refers to the diameter of the micro-particles 9. The units of $\psi_{pi}$ and $\Phi_w$ are $\mu m$.

Figure 6:
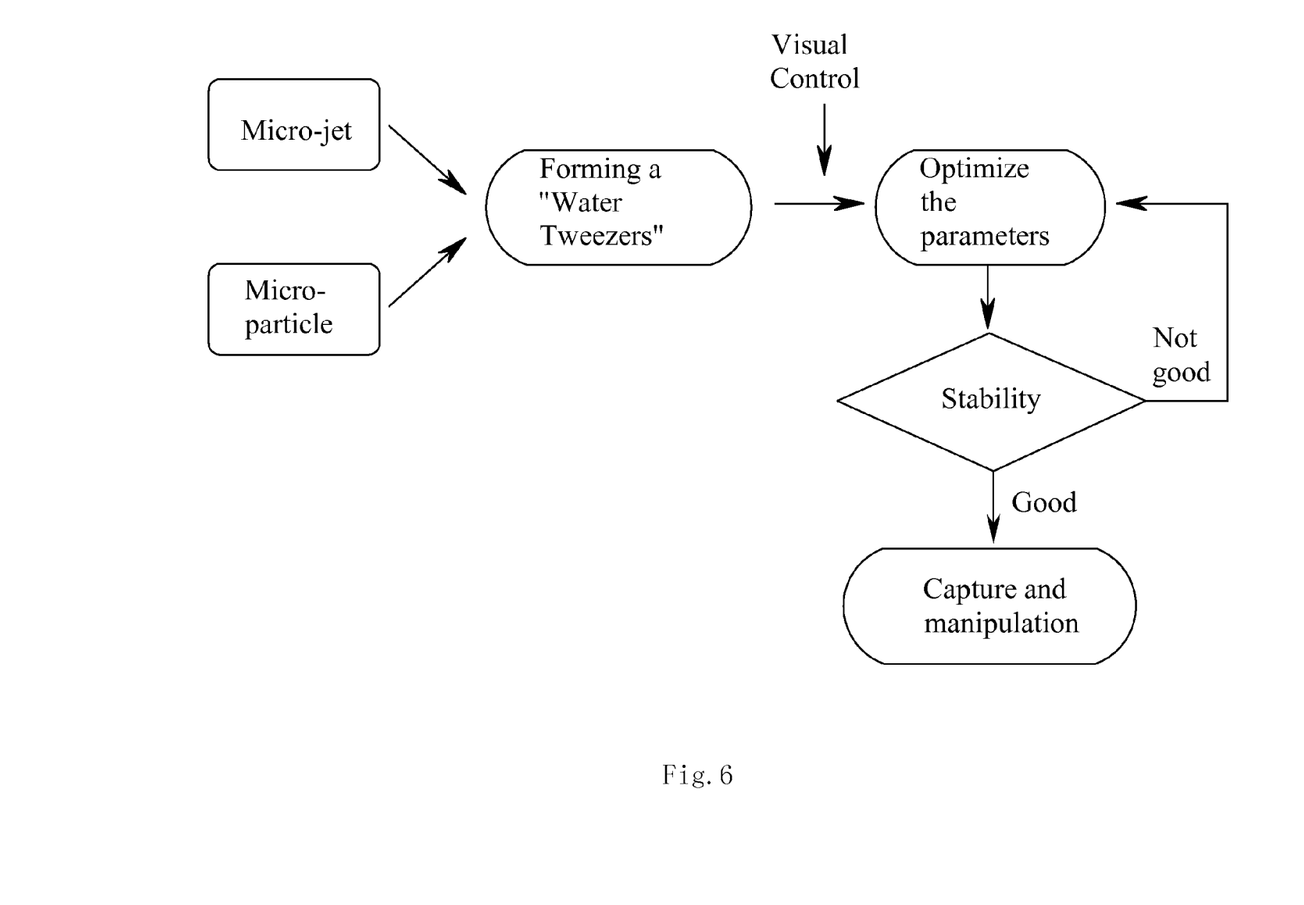
FIG. 6 is a flow chart of capturing the micro-particles of the present invention.

The technology roadmap of the "Water Tweezers" capturing the micro-particle in the embodiment is shown in FIG. 6. First, through the micro jet nozzle 1, the hydraulic device 3 produces the micro jet 14 which forms a "Water Tweezers" on the surface of the micro-particle 9 in the process of jetting to the micro-particle 9. By visual control, the parameters of the "Water Tweezers" can be optimized (such as adjusting the jet velocity, the radius of the micro-particle, the inner diameter of the micro-jet nozzle 1 and other parameters), thereby, forming a stable "Water Tweezers". And then the "Water Tweezers" is used to capture and manipulate the micro-particle 9.

To facilitate the observation and operation of the micro-particle 9 capturing process, the micro-particle 9 is the plastic fluorescent particle which is insoluble in water and able to float on the surface of the water. The purpose of selecting the fluorescent particle as the micro-particle 9 is to facilitate the visual tracking and image capturing. The parameters selected in the embodiment are as follows: The inner diameter of the annular jet hole 13 in the micro-jet nozzle 1 $\psi_{pi}=145$ $\mu m$, the outer diameter of the annular jet hole 13 in the micro jet nozzle 1 $\psi_{po}$=400 μm, the diameter of the micro-particles 9 $\Phi_w$=150 μm. The inner diameter of the water beam is matched with the diameter of the micro-particles 9, i.e. the inner diameter of the annular jet hole 13 in the micro jet nozzle 1 and the diameter of the micro-particles 9 meet the relation: $\Phi_w$−10 μm≤$\psi_{pi}$≤$\Phi_w$. The jet pressure is 2000 bar. Thus, the micro-jet 14 shot out from the micro-jet nozzle 1 is a hollow ring water beam, and able to form the uniform flow with stable performance through the pressure regulator 2.

(1) When the micro-jet 14 shoots to the micro-particle 9 on the liquid surface, it will cause the disturbance of the liquid surface, producing the surface tension.

(2) When the micro-jet 14 is blocked by the micro-particle 9, it will produce the flow-around lift 92 perpendicular to the flowing direction of the jet.

(3) When the micro-jet 14 slips from the surface of the micro-particle 9, it will form a symmetric vortex 141 (swirling flow) in the lower portion of the micro-particle 9, which will generates an upward force to support the lower portion of the micro-particle 9. Therefore, the micro-particle 9 is operated by the upward supporting force 91.

(4) The supporting force 91 and the flow-around lift 92 directly act on the micro-particle 9 and clamp it like a tweezers, forming a "Water Tweezers".

(5) Under the resultant force, the micro-particle 9 is wrapped inside the hollow micro-jet 14. When the upward resultant force and the gravity of the micro-particle 9 are in balance, the micro-particle 9 remains in a certain position inside the water beam, and then the capture of the micro-particle 9 with the "Water Tweezers" can be achieved.

The forces acted on the micro-particle 9 of the embodiment are showed in FIG. 3. The micro-particle 9 is under the inward flow-around lift 92 as well as the upward supporting force 91 of the symmetric vortex 141 (swirling flow) at the same time. As the micro-particle is light, the supporting force 91 is greater than its gravity. Therefore, the resultant force on the micro-particle 9 is inward and upward. In the environment of the micro-jet 14, the symmetric vortex 141 (swirling flow) and the differential pressure jointly form the "Water Tweezers". Clamped by the "Water Tweezers" which can tightly clamp the micro-particle 9 like a tweezers and always make the micro-particle 9 remain in the center of the bottom of the jet water beam without being washed away, and complete the capture of the micro-particle 9 with the "Water Tweezers".

The embodiment provides a new device and method to capture the micro-particle 9—"Water Tweezers". The realization and implementation of the "Water Tweezers" are easier, facilitating the promotion and application, and provide a new technical means for realizing the "deposition formation" of the micro-particle 9 in the micro-manufacturing field. It is of an important theoretical significance and potential application value.

Figure 7:
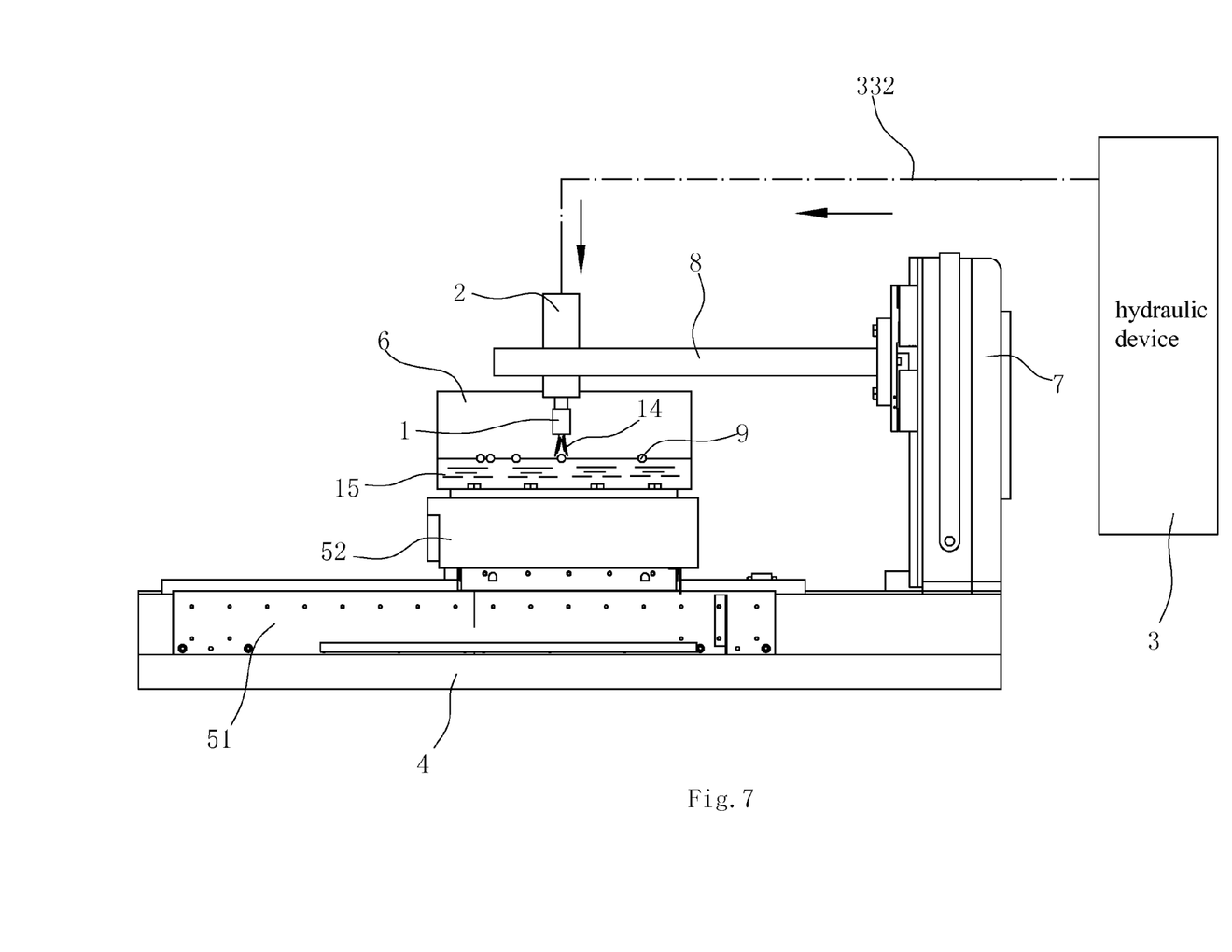
FIG. 7 is a view of micro-particles transport equipment provided with the device in accordance with the embodiment of the present invention.
Figure 8:
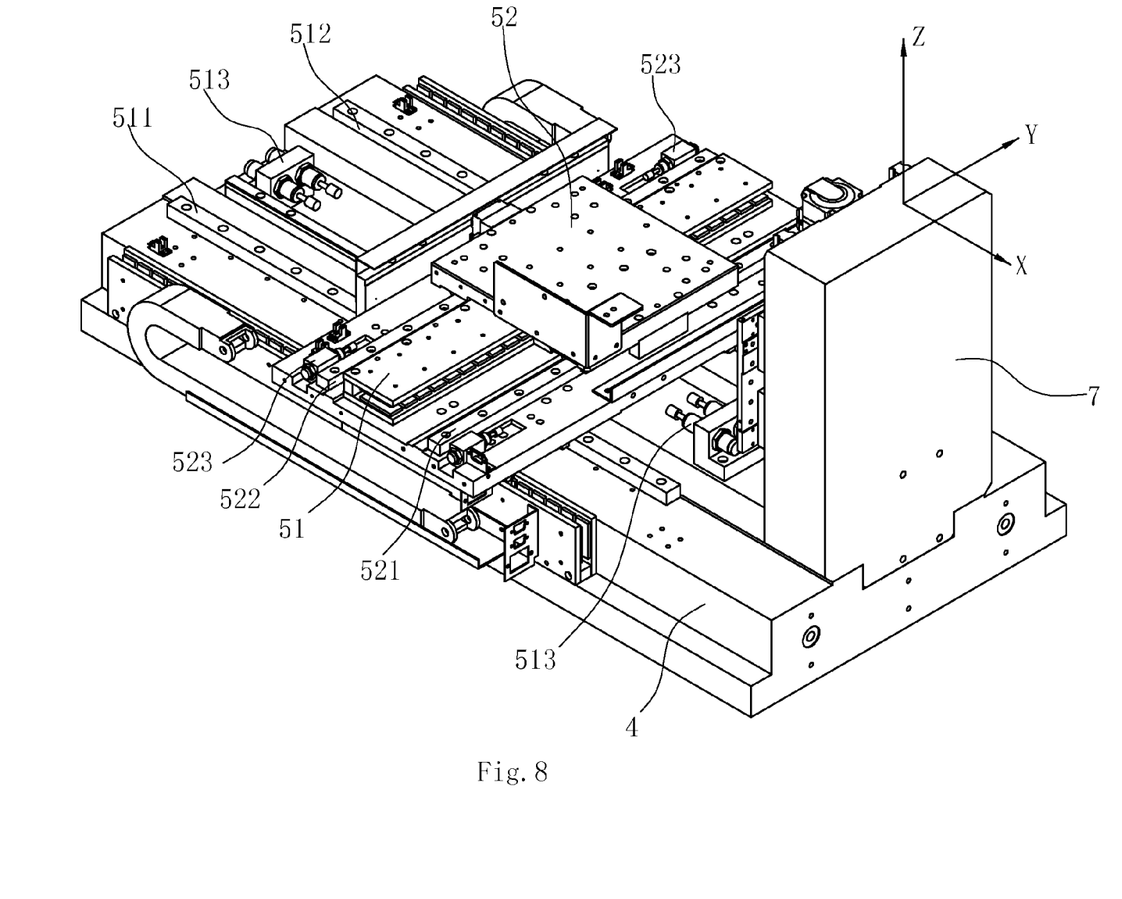
FIG. 8 is a perspective view of a feed system of the micro-particles transport equipment shown in FIG. 7.
Figure 9:
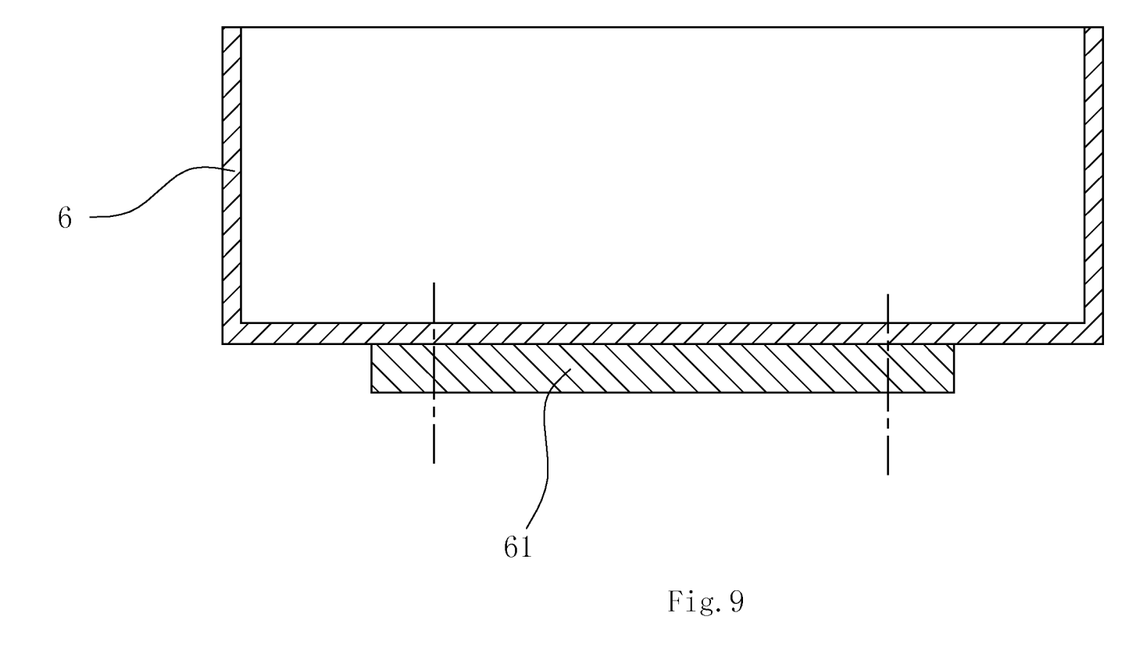
FIG. 9 is a sectional view of the container of the micro-particles transport equipment shown in FIG. 7.
Figure 10:
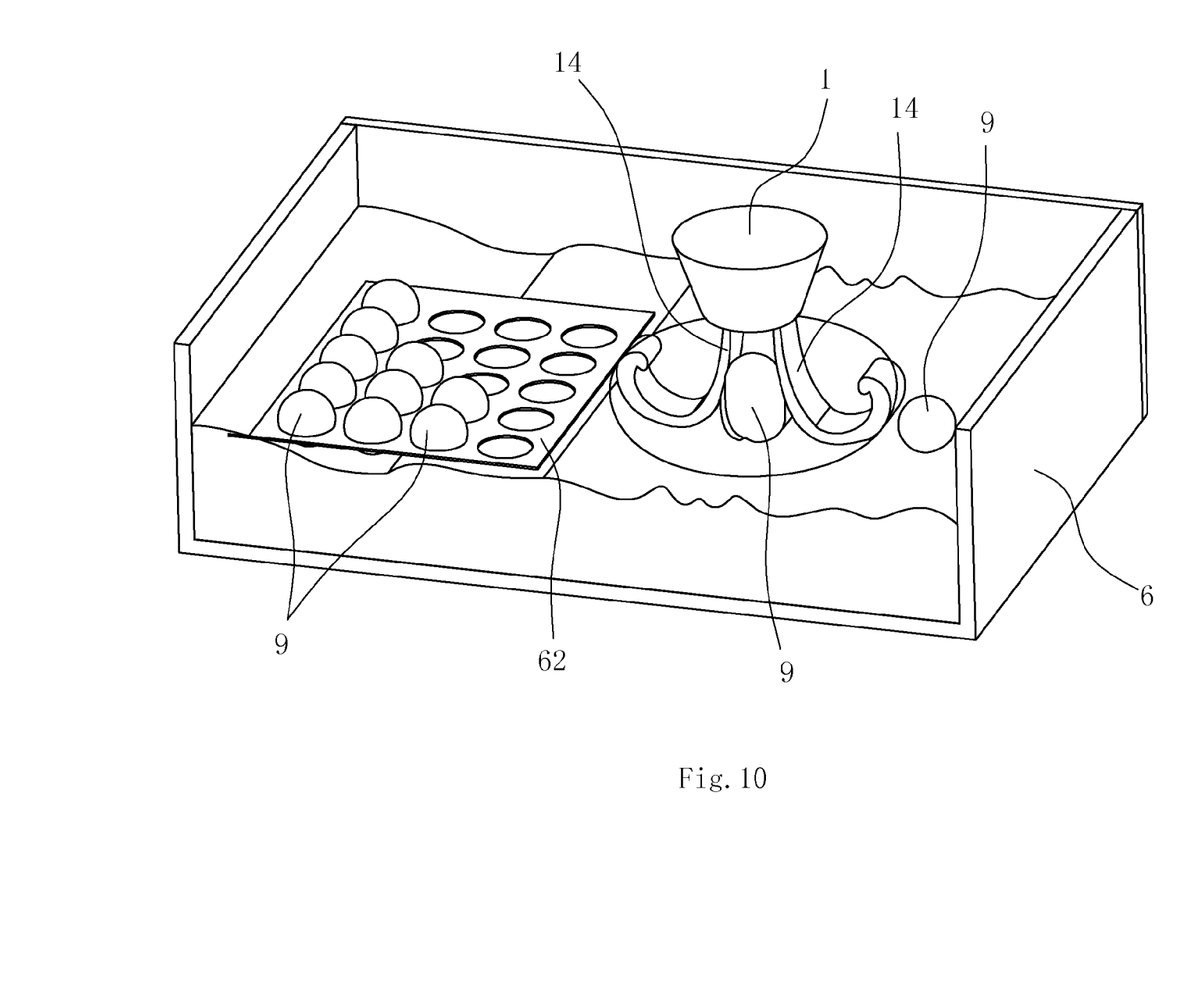
FIG. 10 is a perspective view of the micro-jet nozzle and the micro-particle when the micro-particle is transported.

FIGS. 7-10 show a micro-particles transport equipment using the above device of the embodiment, which comprises:

a base 4;

a first motor and a second motor;

a workbench, which includes a first base 51 and a second base 52, the base 4 is provided with a first guiding rail 511 arranged along the length direction (X-axis) of the base 4, the first base 51 can move straightly along the first guiding rail 511 driven by the first motor; the first base 51 is provided with a second guiding rail 521 arranged along the width direction (Y-axis) of the base 4, the second base 52 can move straightly along the second guiding rail 521 driven by the second motor. And both the first and second motors are linear motors. A first grating ruler 512 is provided at the side of the first guiding rail 511 which can track and back feed the position of the first base 51, and a second grating ruler 521 is provided at the side of the second guiding rail 521 which can track and back feed the position of the second base 52. The base 4 is also provided with a first anti-collision device 513 which can limit the moving distance of the first base 51, while the first base 51 is provided with a second anti-collision device 523 which can limit the moving distance of the second base 52;

a transparent container 6, which contains the micro-particles 9, the bottom of which has a fixing device which can be fixed on the second base 52 of the workbench by a bolt, so that the container 6 can be fixed on the workbench. The micro jet nozzle 1 is disposed above the top of the container 6. The container 6 is also provided with a micro-particle accommodating box 62 for the deposition formation of the micro-particles 9, see FIG. 10;

a supporting seat 7 provided perpendicular to the base 4, which has a bracket 8 disposed perpendicular to the extending part of the supporting seat 7 which can move straightly along a vertical direction (Z-axis). The bracket 8 is driven by the third motor for going up and down. One end of the bracket 8 is fixed with the pressure regulator 2 disposed on the micro jet nozzle 1. When the bracket 8 moves along the supporting seat 7, the jetting height of the micro-jet nozzle 1 can be adjusted along the vertical direction.

In the embodiment, the micro-particles transport equipment mainly comprises the portion of the micro jet nozzle 1 to generate the micro jet 14 through the hydraulic device, and a high-precision feed system to make the container 6 move in the horizontal plane, so that the micro-jet nozzle 1 can always aim at the micro-particles 9 in the container 6. Wherein, the high-precision feed system is driven by a linear motor, and can achieve the moving of the workbench in the X-axis and Y-axis directions and the going up and down of the bracket 8 in the Z-axis direction. The linear motor can ensure to achieve a very low thrust ripple under the low and high speeds, so as to guarantee the constant velocity and the precise positioning. Regardless of the moving direction, it can always strictly guarantee the smoothness and straightness of the moving to achieve the precise shifting in the plane. In this embodiment, the positioning accuracy of the linear motor of the embodiment is ±2 μm; the repeated positioning accuracy is 1 μm; the maximum velocity is 1 m/s and the acceleration is 1 m/s$^2$.

In addition, the first grating 512 installed on the first guiding rail 511 can track the moving of the first base 51 and back feed the position of the first base 51. The first anti-collision device 513 can achieve the travel control of the first base 51. The second grating 522 installed on the second guiding rail 521 can track the moving of the second base 52 and back feed the position of the second base 52. The second anti-collision device 523 can achieve the travel control of the second base 52. The bracket 8 moving in the vertical direction can be also provided with a third grating and a third anti-collision device to detect and back feed the position of the bracket 8 on the supporting seat 7 and limit the lifting stroke of the bracket 8. In this embodiment, the stroke of the workbench in the embodiment (respectively along the X-axis and Y-axis) is 500 mm×400 mm. The stroke of the bracket 8 along the vertical direction (Z-axis) is 100 mm~200 mm.

Thus, in the operation, the workbench moves and the height of the bracket 8 is adjusted, so that the micro jet nozzle 1 aims at the micro-particles 9 in the container 6 for shooting. After the "Water Tweezers" produced by the micro-jet nozzle 1 clamps the micro-particle 9, the workbench will move again, so that the clamped micro-particle 9 can move into the micro-particle accommodating box, thereby one process of the transport of the micro-particle 9 is completed.

The present invention utilizes the fluid characteristics of the boundary layer of the micro-particle surface to obtain a "Water Tweezers" which can clamp the micro-particle 9. The "Water Tweezers" can wrap the micro-particle 9 inside to make the micro-particle 9 be captured. When the Water Tweezers moves, the central position of the micro-jet 14 deviates from the center of the captured micro-particle 9 and forms a front and rear differential pressure along the moving direction around the micro-particle 9, the micro-particle 9 will move under the differential pressure, achieving the transport and manipulation of the micro-particle 9 finally. The device used for capturing micro-particles of the embodiment may obtain the effect of the "Water Tweezers" under ordinary experimental conditions, which is simple and practical, easier to implement and operate. It not only provides a new way of micro-particle operation, but also brings new ideas and methods for the deposition formation of the micro-particles in the micro-manufacturing field.

The invention claimed is:

1. A device for capturing micro-particles, each micro-particle having a diameter, comprising:
    a pressure regulator having an input and an output;
    a micro-jet nozzle coupled to the pressure regulator, the micro-jet nozzle having a length and an axis; and
    a hydraulic device, for providing injection liquid for the micro-jet nozzle, having an outlet pipe connected to the input of the pressure regulator,
    wherein
        the micro-jet nozzle is provided with an annular jet hole disposed substantially parallel along the axis of the micro-jet nozzle and extends through the length of the micro-jet nozzle and the micro-jet nozzle further comprises a nozzle housing and a nozzle core, the nozzle housing being provided with a through hole with an inner wall extending along the axis of the micro-jet nozzle, the nozzle core comprises a core head and an elongated core body extending from the core head and through the length of the micro-jet nozzle, the core head sitting on the top of the nozzle housing and attached to the nozzle housing, the core body with a uniform cross section being inserted in the through hole, and the annular jet hole being formed between the inner wall of the through hole of the nozzle housing and the core body, and a plurality of inlet holes are formed on the core head,
        the annular jet hole having a bottom end, a top end, an inner diameter, an entrance port located at the top end, and an injection port located at the bottom end, the inner diameter of the annular jet hole matches the diameter of the micro-particles to be captured,
        the output of the pressure regulator is connected to the entrance port of the micro-jet nozzle.

2. The device of claim 1, wherein the inner diameter $\psi_{pi}$ of the annular jet hole and the diameter $\Phi_w$ of the micro-particles meet the following condition: $\Phi_w - 10\ \mu m \le \psi_{pi} \le \Phi_w$, the units of $\psi_{pi}$ and $\Phi_w$ are $\mu m$.

3. The device of claim 1, wherein the nozzle core has a T-shaped cross section and extends along a central axis of the nozzle core, and the plurality of inlet holes comprise multiple holes distributed circumferentially on the core head of the nozzle core, the core head is attached to the nozzle housing through at least one bolt.

4. The device of claim 1, wherein the hydraulic device comprises:
    a plunger pump;
    a motor connected to the plunger pump; and
    a supercharger connected to the plunger pump through a hydraulic oil passage, which is provided with a directional control valve, the supercharger being activated by the plunger pump through the hydraulic oil passage, the supercharger making the injection liquid be absorbed and be discharged.

5. A micro-particles transporting equipment provided with the device of claim 1, comprising:
    a base having a length and a width;
    a workbench, disposed on top of the base and able to move along the length and along the width of the base;
    a container containing the micro-particles, which is fixed on the workbench and below the micro-jet nozzle;
    a supporting seat, movably disposed perpendicularly on the base, and provided with a bracket extending outwardly from and perpendicularly to the supporting seat which can move vertically and, the end of the bracket is attached to the pressure regulator.

6. The micro-particles transporting equipment of claim 5, wherein the workbench includes a first base placed on top of the base, a second base placed on top of the first base, a first motor for moving the first base, and a second motor for moving the second base;
    the base is provided with a first guiding rail arranged along the length of the base, the first base can move along the first guiding rail driven by the first motor;
    the first base is provided with a second guiding rail arranged along the width of the base, the second base can move along the second guiding rail driven by the second motor.

7. The micro-particles transporting equipment of claim 6, wherein the first guiding rail has a first grating ruler for tracking and back feeding the first base, and the second guiding rail has a second grating ruler for tracking and back feeding the second base.

8. The micro-particles transporting equipment of claim 6, wherein the base further comprises a first anti-collision device for limiting movement of the first base, while the first base further comprises a second anti-collision device for limiting movement of the second base.

9. The micro-particles transporting equipment of claim 6, wherein the first and second motors are linear motors.

* * * * *